US011496591B2

(12) United States Patent
Starobin et al.

(10) Patent No.: US 11,496,591 B2
(45) Date of Patent: Nov. 8, 2022

(54) SYSTEM AND METHOD FOR SELECTING AND PROVIDING ZONE-SPECIFIC MEDIA

(71) Applicant: Sound United, LLC., Vista, CA (US)

(72) Inventors: Bradley M. Starobin, Baltimore, MD (US); Matthew Lyons, York, PA (US); Stuart W. Lumsden, Ruxton, MD (US); Michael DiTullo, Encinitas, CA (US); Paul O'Connor, Portland, OR (US)

(73) Assignee: SOUND UNITED, LLC, Vista, CA (US)

(*) Notice: Subject to any disclaimer, the term of this patent is extended or adjusted under 35 U.S.C. 154(b) by 0 days.

(21) Appl. No.: 17/735,243

(22) Filed: May 3, 2022

(65) Prior Publication Data
US 2022/0263918 A1 Aug. 18, 2022

Related U.S. Application Data

(63) Continuation of application No. 14/726,109, filed on May 29, 2015, now Pat. No. 11,356,520.

(51) Int. Cl.
| G06F 15/16 | (2006.01) |
| H04L 67/52 | (2022.01) |
| H04L 67/12 | (2022.01) |
| H04L 65/1089 | (2022.01) |
| H04L 67/04 | (2022.01) |
| H04L 65/612 | (2022.01) |
| H04L 65/613 | (2022.01) |
| H04L 67/60 | (2022.01) |
| H04L 67/61 | (2022.01) |
| H04L 67/50 | (2022.01) |

(52) U.S. Cl.
CPC .......... *H04L 67/52* (2022.05); *H04L 65/1089* (2013.01); *H04L 65/612* (2022.05); *H04L 65/613* (2022.05); *H04L 67/04* (2013.01); *H04L 67/12* (2013.01); *H04L 67/535* (2022.05); *H04L 67/60* (2022.05); *H04L 67/61* (2022.05)

(58) Field of Classification Search
CPC ......... H04L 67/52; H04L 67/04; H04L 67/12; H04L 67/535; H04L 67/60; H04L 67/61; H04L 65/1089; H04L 65/612; H04L 65/613
See application file for complete search history.

(56) References Cited

U.S. PATENT DOCUMENTS

| 9,916,839 B1* | 3/2018 | Scalise | G10L 21/00 |
| 2005/0080849 A1 | 4/2005 | Wee et al. | |
| 2006/0206340 A1* | 9/2006 | Silvera | G11B 27/34 |
| | | | 704/E15.045 |
| 2011/0276335 A1* | 11/2011 | Silvera | G10L 15/26 |
| | | | 704/E21.001 |
| 2012/0082424 A1* | 4/2012 | Hubner | H04N 21/242 |
| | | | 386/E5.032 |

(Continued)

Primary Examiner — Richard G Keehn
(74) Attorney, Agent, or Firm — McAndrews, Held & Malloy, Ltd.

(57) ABSTRACT

A system and method for providing zone-specific media to a user. As a non-limiting example, various aspects of this disclosure provide a system and method that flexibly selects and provides media content (e.g., audio content), where such content is selected based, at least in part, on a user location (e.g., location within a premises).

20 Claims, 6 Drawing Sheets

(56) References Cited

U.S. PATENT DOCUMENTS

| | | | | |
|---|---|---|---|---|
| 2014/0181202 A1* | 6/2014 | Gossain | ................ | H04L 67/10 |
| | | | | 709/204 |
| 2014/0269425 A1* | 9/2014 | Fisher | ................ | H04L 67/1095 |
| | | | | 370/254 |
| 2014/0330885 A1* | 11/2014 | Schulert | ................ | H04L 65/80 |
| | | | | 709/201 |
| 2015/0094834 A1* | 4/2015 | Vega | ................ | G06F 3/162 |
| | | | | 700/94 |
| 2015/0121406 A1 | 4/2015 | Chai et al. | | |
| 2015/0256954 A1* | 9/2015 | Carlsson | ................ | H04R 3/12 |
| | | | | 381/59 |
| 2016/0088032 A1 | 3/2016 | Corbin et al. | | |
| 2016/0299736 A1 | 10/2016 | Bates et al. | | |

* cited by examiner

SYSTEM AND METHOD FOR SELECTING AND PROVIDING ZONE-SPECIFIC MEDIA

CROSS-REFERENCE TO RELATED APPLICATIONS/INCORPORATION BY REFERENCE

The present application is a continuation of U.S. application Ser. No. 14/726,109, filed May 29, 2015.

The present application is related to U.S. application Ser. No. 14/725,904, filed May 29, 2015, and U.S. application Ser. No. 14/726,019, filed May 29, 2015 The aforementioned documents are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Present systems and methods for presenting audio, for example presenting audio to a user as the user moves throughout a premises, are inadequate. Further limitations and disadvantages of conventional and traditional approaches will become apparent to one of skill in the art, through comparison of such approaches with the present disclosure as set forth in the remainder of the present application with reference to the drawings.

BRIEF DESCRIPTION OF SEVERAL VIEWS OF THE DRAWINGS

The accompanying drawings are included to provide a further understanding of the present disclosure, and are incorporated in and constitute a part of this specification. The drawings illustrate examples of the present disclosure and, together with the description, serve to explain various principles of the present disclosure. In the drawings.

SUMMARY

Figure 1:
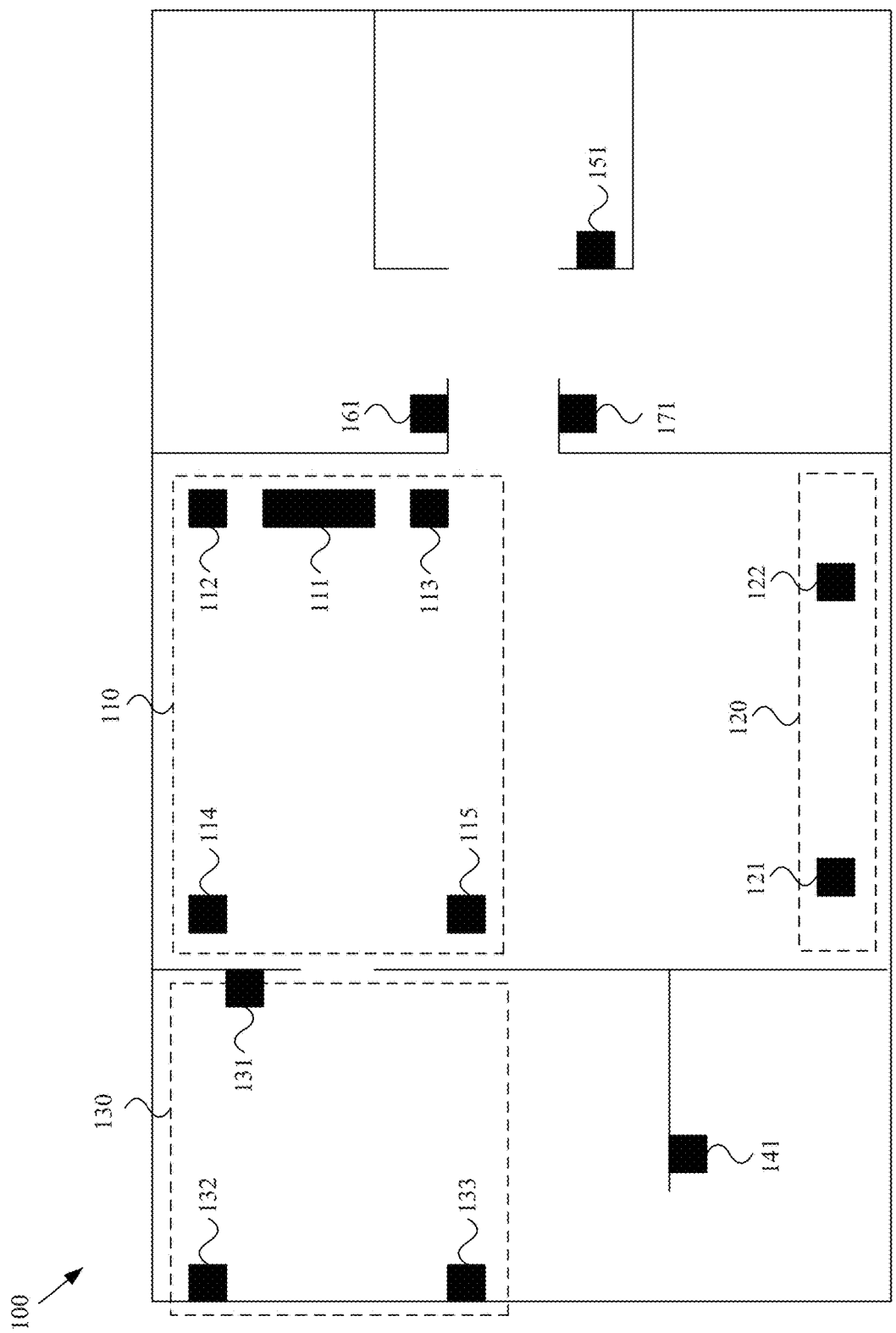
FIG. 1 is a diagram of an example multi-zone media environment, in accordance with various aspects of the present disclosure.

Various aspects of this disclosure provide a system and method for selecting and providing zone-specific media to a user. As a non-limiting example, various aspects of this disclosure provide a system and method that flexibly selects and provides media content (e.g., audio content), where such content is selected based, at least in part, on a user location (e.g., location within a premises).

DETAILED DESCRIPTION OF VARIOUS ASPECTS OF THE DISCLOSURE

The following discussion presents various aspects of the present disclosure by providing various examples thereof. Such examples are non-limiting, and thus the scope of various aspects of the present disclosure should not necessarily be limited by any particular characteristics of the provided examples. In the following discussion, the phrases "for example," "e.g.," and "exemplary" are non-limiting and are generally synonymous with "by way of example and not limitation," "for example and not limitation," and the like.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. Similarly, the term "module" may be utilized herein to refer to a pure hardware module and/or a hybrid hardware/software module (e.g., a processor that operates in accordance with software instructions stored in a memory or other non-transitory medium).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "has," "comprising," "including," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a device may be turned sideways so that its "top" surface is facing horizontally and its "side" surface is facing vertically, without departing from the teachings of the present disclosure.

Various aspects of the present disclosure comprise a multi-zone media system and method for providing multi-zone media. As a non-limiting example, various aspects of this disclosure provide a system and method that flexibly selects and provides media content (e.g., audio content), where such content is selected based, at least in part, on a user location (e.g., location within a premises).

The above and other aspects of the present disclosure will be described in or be apparent from the following description of various example implementations.

FIG. 1 is a diagram of an example multi-zone media environment 100, in accordance with various aspects of the present disclosure.

The example environment 100 comprises a variety of loudspeakers and groups thereof, spaced throughout an example premises (e.g., a home or private residence, office, campus, etc.). The discussion of various examples herein will often refer to the example environment 100. Though the example environment 100 is generally presented in the context of audio media presentation, it should be understood that the example environment 100 and all examples presented herein readily extend to the presentation of other forms of media (e.g., video media). Additionally, though the example environment 100 as discussed herein generally focuses on areas (or zones) within a premises structure, it should be understood that a premises, unless otherwise specified, in this discussion generally includes outdoor areas (e.g., a patio, deck, driveway, yard, etc.) as well as indoor areas.

The example environment 100 may, for example, comprise a first group of loudspeakers 110, which may also be referred to herein as a zone. The first group of loudspeakers 110 may, for example, correspond to a first area (or audio zone) of a premises, for example a family room, media room, etc. The first group of loudspeakers 110 may, for example, comprise a central media controller 111. The central media controller 111 may comprise characteristics of any of a variety of central media controllers (e.g., an entertainment center, audio receiver, home media hub, home audio server, general purpose computer operating in accordance with software instructions, an Internet media access point or content server, etc.). The central media controller 111 may generally, for example, manage the presentation of media content throughout the example environment 100. Though the example environment 100 is generally shown and discussed as having a central media controller 111, it should be understood that the environment 100 may also operate in a mesh-type or decentralized configuration. For example, as will be discussed herein, any of the media presentation devices (e.g., loudspeakers, etc.) discussed herein may perform any or all of the control functionality discussed herein.

The first group of loudspeakers 110 may also, for example, comprise a first (e.g., front left) loudspeaker 112, a second (e.g., front right) loudspeaker 113, a third (e.g., rear right) loudspeaker 114, and a fourth (e.g., rear left) loudspeaker 115. The central media controller 111 may also, for example, comprise a loudspeaker. Each of the first group of loudspeakers 110 may, for example, be operated independently or may be operated as a single group. Each of the first group of loudspeakers 110 may, for example, operate under the control of the central media controller 111 and/or operate autonomously. Note that the designations of the loudspeakers as left, right, front, rear, center, etc. may, but need not, refer to audio spatial arrangements generally synonymous with various loudspeaker arrangements (e.g., stereo, surround sound, monaural, etc.).

The example environment 100 may also, for example, comprise a second group of loudspeakers 120. The second group of loudspeakers 120 may, for example, comprise a first (e.g., right) loudspeaker 121 and a second (e.g., left) loudspeaker 122. The second group of loudspeakers 120 may, for example, correspond to a second area (or audio zone) of a premises, for example a kitchen or dining room, a break room, etc. Each of the second group of loudspeakers 120 may, for example, be operated independently or may be operated as a single group. Each of the second group of loudspeakers 120 may, for example, operate under the control of the central media controller 111 and/or operate autonomously. Also for example, any or all of the second group of loudspeakers 120 may operate with any or all of the other loudspeakers in the environment 100.

The example environment 100 may additionally, for example, comprise a third group of loudspeakers 130. The third group of loudspeakers 130 may, for example, comprise a first (e.g., central) loudspeaker 131, a second (e.g., right) loudspeaker 132, and a third (e.g., left) loudspeaker 133. The third group of loudspeakers 130 may, for example, correspond to a third area (or zone) of a premises, for example a master bedroom, garage, shop, etc. Each of the third group of loudspeakers 130 may, for example, be operated independently or may be operated as a single group. Each of the third group of loudspeakers 130 may, for example, operate under the control of the central media controller 111 and/or operate autonomously. Also for example, any or all of the third group of loudspeakers 130 may operate with any or all of the other loudspeakers in the environment 100.

The example environment 100 may further, for example, comprise a loudspeaker 141 in a fourth area (or room or zone) (e.g., in a master bath), a loudspeaker 151 in a fifth area (e.g., in a guest bath), a loudspeaker 161 in a sixth area (e.g., in a guest room), and a loudspeaker 171 in a seventh area (e.g., in an office). Though many examples presented herein include audio content presentation examples, the scope of this disclosure is not limited to audio content.

Figure 2:
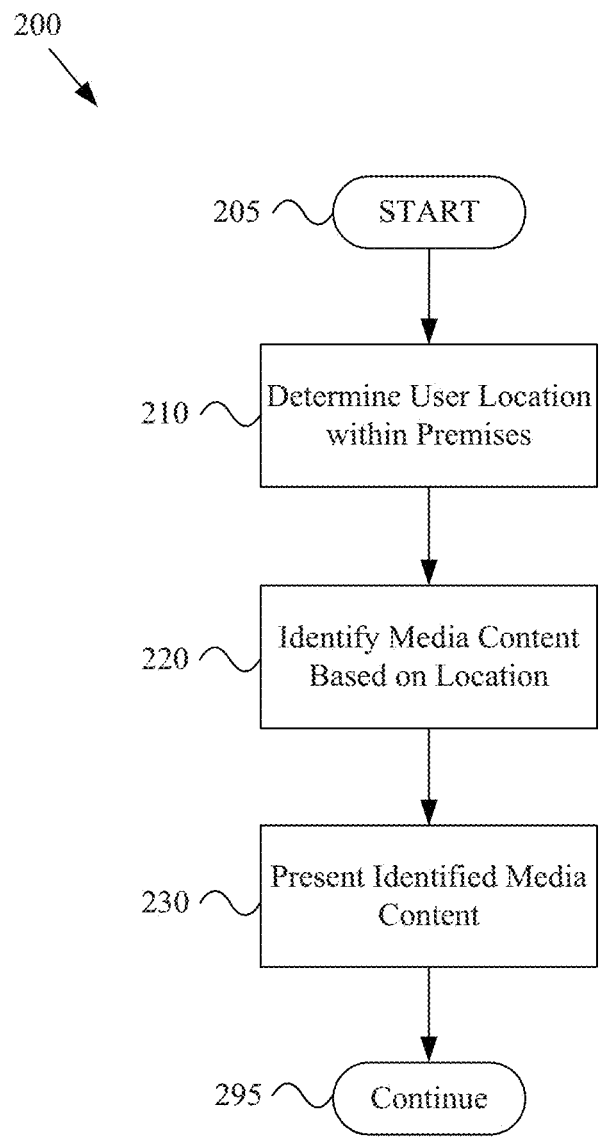
FIG. 2 is a flow diagram of an example method for providing zone-specific media, in accordance with various aspects of the present disclosure.

Referring next to FIG. 2, such figure is a flow diagram of an example method 200 for providing zone-specific media, in accordance with various aspects of the present disclosure. The example method 200 may, for example, share any or all characteristics with the other methods discussed herein (e.g., with regard to FIGS. 3 and 6). For example, any or all blocks of the example method 200 may be integrated into any of such methods and vice versa. The example method 200, or any portion thereof, may be implemented at a loudspeaker, a central media controller, a television, an audio presentation system, a personal computing system, a plurality of system components, a distributed system comprising local and remote components, any of a variety of types of media presentation systems, etc.

The example method 200 begins executing at block 205. The example method 200 may begin executing in response to any of a variety of causes or conditions. The method 200 may, for example, begin executing when a media presentation system implementing the method 200 is powered up, reset, or turned on. The method 200 may also, for example, begin executing when a media presentation system implementing the method 200 receives a command from a user to present audio content and/or to present audio content in a manner that permits the user to flexibly play or transfer music to various zones (e.g., receiving a command directly at the system, receiving a command from a remote controller, receiving a command from a user's smart phone, etc.). The method 200 may further, for example, begin executing in response to the media presentation system (e.g., a controller, loudspeaker, etc.) exiting from a sleep mode. Also for example, the method 200 may begin executing in response to detecting a user input (e.g., a touch command, a voice command, etc.) at a component of the media presentation system (e.g., at a loudspeaker, at a controller, at a sensor independent of a loudspeaker or controller, etc.). Additionally, for example, the method 200 may begin executing in response to detecting a user input at a sensor physically independent of yet communicatively coupled to a media presentation system or a component thereof (e.g., a sensor of a security system, home automation system, etc.). Still further for example, block 205 may receive execution flow from any of the blocks of the example method 200 and/or from any flow diagram block discussed herein (e.g., at FIGS. 3 and 6). Also for example, block 205 may begin executing in response to a message received from a remote server (e.g., from a content provider). In general, the method 200 may begin executing in response to any of a variety of causes or conditions. Accordingly, the scope of this disclosure should not be limited by characteristics of any particular initiating cause or condition.

The example method 200 may, at block 210, comprise determining (or tracking) user location within a premises. Block 210 may comprise determining user location in any of a variety of manners. For example, block 210 may comprise utilizing an array of sensors to determine user location. Such sensors may, for example, be integrated with a loudspeaker and/or loudspeaker system implementing one or more of the aspects of the method 200 (e.g., included on or within a loudspeaker enclosure, controller enclosure, etc.). Also for example, such sensors may generally be associated with another system (e.g., a home security system, premises-based wireless communication network, home control system, etc.) that is communicatively coupled to a media presentation system implementing one or more of the aspects of the method 200. For example, a media presentation system that generally operates to present media content (e.g., audio content, video content, etc.) to a user may be integrated with such other systems to leverage their user-locating or tracking capabilities.

Block 210 may comprise determining user location utilizing any of variety of types of sensors. For example, block 210 may comprise determining user location based on (e.g., based at least in part on, based in part on, or based only on) information from a motion sensor (e.g., active, passive, etc.), heat or IR sensor (e.g., detecting a user's body heat), light sensor (e.g., detecting when a light has been turned on, when light to the light sensor has been interrupted by a passing user, etc.), vibration sensor (e.g., detecting structural vibrations due to a user walking by), sound sensor (e.g., detection of nearby noise, voice detection, voice recognition, voice identification, etc.), operation of home control devices (e.g., light switches, water control valves, thermostats, appliances, blinds, ceiling fans, etc.), door operation (e.g., interior door, exterior door, garage door, refrigerator door, washer/dryer door, cabinet door, dresser drawers, etc.), operation of home electronic devices (e.g., computers, stereos, video games, home entertainment systems, intercom systems, etc.). For example, loudspeaker location and sensor location may be known, so user proximity detected by a particular sensor may be tied to one or more loudspeakers (e.g., individually, logically grouped into a set of loudspeakers or audio zone, etc.).

Block 210 may also, for example, comprise determining user location based at least in part on one or more signals received from a personal electronic device (e.g., a carriable and/or wearable device, a smart phone, a watch, a wireless earpiece, a wearable pendant, a bracelet, a ring, etc.). For example, a receiver at a known location detecting a wireless signal may determine how close the user is to the receiver based, at least in part, on signal strength. Also for example, a plurality of receivers receiving a wireless signal at respective signal strengths may be utilized to triangulate the user's position. Further for example, a personal electronic device worn or carried by the user may have its own position-determining capability (e.g., GPS, cellular triangulation, Wi-Fi triangulation, etc.), and then communicate the user's location within the premises to the media presentation system (e.g., to a loudspeaker, central controller, or other equipment implementing one or more aspects of the example method 200).

Block 210 may comprise determining and/or representing location in any of a variety of representations. For example, block 210 may comprise determining a user's exact or approximate coordinates. Also for example, block 210 may comprise determining a zone (or area) in which the user is located (e.g., a room or region of a home). For example, in an example scenario in which respective media content is identified (e.g., at block 220) for a finite set (or enumerated list) of zones, block 210 may comprise selecting the zone of the finite set of zones that most closely corresponds to a user's location (e.g., the zone in which the user is located, the zone closest to the user's location, the zone in which the user was most recently determined to be in, etc.). The scope of this disclosure should not be limited by characteristics of any particular manner of representing a user's location.

Block 210 may, for example, comprise determining location of a single user or multiple users. For example, in an example implementation in which a system implementing the method 200 is providing audio content to a plurality of users, block 220 may comprise determining the location of each user and selecting/providing respective audio content to each user.

Various examples of determining or tracking user location are presented in U.S. application Ser. No. 14/726,019, filed concurrently herewith, titled "System and Method for Providing User Location-based Multi-zone Media,", the contents of each of which are hereby incorporated herein by reference in their entirety. For example, the determined user location may be a present location or a predicted location, for example, based on present and/or past user movement patterns. For example, a user may be observed moving from a master bedroom zone 130 toward a kitchen zone 120, in which case the user location may be identified as the kitchen zone 120, even though the user has not yet entered the kitchen zone 120.

Note that block 210 may also comprise determining (or tracking) user location based at least in part on direct user input to a sensor (e.g., a sensor incorporated into a loudspeaker enclosure). Non-limiting examples of such operation are presented in U.S. application Ser. No. 14/725,904, filed concurrently herewith, titled "Multi-zone Media System and Method for Providing Multi-zone Media,", and U.S. application Ser. No. 14/726,019, filed concurrently herewith, titled "System and Method for Providing User Location-based Multi-zone Media,", the contents of each of which are hereby incorporated herein by reference in their entirety.

In general, block 210 may comprise determining (or tracking) user location with a premises. Block 210 may comprise performing such determining (or tracking) in any of a variety of manners. Accordingly, the scope of various aspects of this disclosure should not be limited by characteristics of any particular manner of performing such determining (or tracking).

The example method 200 may, at block 220, comprise identifying media content based at least in part on user location. Block 220 may comprise identifying the media content in any of a variety of manners, non-limiting examples of which are presented herein.

The media content may, for example, comprise any of a variety of characteristics. For example, the media content may comprise audio and/or video. The media content may, for example, comprise advertising content, for example advertising content associated with particular zones of a premises (e.g., a kitchen zone, a rec room zone, a family room zone, a laundry room zone, a bedroom zone, a bathroom zone, a garage zone, a patio zone, a three-season room zone, a barbeque zone, a shop zone, a bar zone, etc.).

Block 220 may, for example, comprise identifying the media content by searching a database, table, linked list, or other data structure by the location determined at block 210. For example, searching a database by an identified zone may identify media content corresponding to the identified zone. Also for example, indexing a table by zone may provide an efficient mechanism by which media content associated with the zone may be found. Additionally for example, a linked list may be traversed by an identified zone until a linked data structure associated with the identified zone is found, where the data structure identifies media content for the zone.

In an example advertising content implementation, a table, database, or other data structure may be established that associates (or links) a kitchen zone (e.g., zone 120 of FIG. 1) with advertisements for food, kitchen appliances, cleansers, plumbing services, appliance repair services, kitchen safety products, etc. Also, a recreation room zone (e.g., zone 110 of FIG. 1) may be associated with advertising media content for recreational equipment, games, television systems, audio systems, video games, audio and/or video content, etc. Further for example, a shop or garage zone may be associated with advertising media content for tools, lawn care or landscaping equipment or supplies, home improvement stores, snow removal and/or lawn mowing equipment, etc. Still further for example, a bar room zone may be associated with advertising media content for adult beverages, televisions, games, sports programming, sports equipment, bar furniture and/or appliances, etc. Also for example, a bedroom zone (e.g., zone 130 of FIG. 1) may be associated with advertising media content for linens, clothing, bedroom furniture, etc. Additionally for example, a bathroom zone (e.g., zones 141 and 151 of FIG. 1) may be associated with advertising media content for bathroom supplies, hygiene products, cleaning supplies, etc. Note that a plurality of zones may be aggregated in a super-zone (e.g., all bathroom zones, all bedroom zones, all entertainment-related zones, etc.)

Though the above examples generally discussed advertising media content, as explained herein, various aspects of this disclosure apply to any of a variety of different types of media content. For example, particular genres of music, channels, and/or artists may be associated with particular zones. For example, a first bedroom zone may be associated with content for children, a second bedroom zone may be associated with popular music, and a third bedroom zone may be associated with smooth jazz and new age music. Also for example, a recreation room zone may be associated with rock music, a library or study zone may be associated with classical music, a shop may be associated with country music, and a kitchen associated with world music.

In general, block 220 may comprise identifying media content based at least in part on location. Block 220 may comprise performing such identifying in any of a variety of manners. Accordingly, the scope of various aspects of this disclosure should not be limited by characteristics of any particular manner of performing such identifying or by characteristics of any particular type of media content.

The example method 200 may, at block 230, comprise presenting the identified media content. Block 230 may comprise presenting the identified media content (e.g., as identified at block 220) in any of a variety of manners, non-limiting examples of which are provided herein.

For example, block 230 may comprise generating and communicating signals to loudspeaker circuitry that cause a set of one or more loudspeakers associated with the identified location (e.g., an audio presentation zone) to output the identified media content. For example, block 230 may comprise presenting the identified audio content at a set of loudspeakers associated with an identified zone and having selected audio presentation characteristics (e.g., selected volume, equalization, etc.). Note that each audio presentation zone may be associated with its own set of loudspeakers and its own set of audio presentation characteristics, which may also be user-specific in each zone.

Block 230 may, for example, comprise playing the identified audio content at a current loudspeaker or central controller implementing the method 200 or a portion of the method 200. Block 230 may also, for example, comprise playing the identified audio content at a current loudspeaker different from the loudspeaker or central controller implementing the method 200 or a portion of the method 200.

Block 230 may, for example, comprise presenting the identified media content at the location (or zone) determined at block 210. Block 230 may also comprise presenting the identified media content at other locations of the system, for example at zones adjacent to the identified location (or zone), at all zones serviced by the system, at the determined location (or zone) and a predicted next zone to which the user is expected to move, etc. For example, block 230 may comprise combining the identified media content with other content (e.g., channel, program, etc.) being presented. For example, block 230 may comprise inserting the identified media content in an audio or video stream (e.g., during a commercial break).

Various examples of manners in which block 230 may present the identified media content are also provided in U.S. application Ser. No. 14/725,904, filed concurrently herewith, titled "Multi-zone Media System and Method for Providing Multi-zone Media,", and U.S. application Ser. No. 14/726,019, filed concurrently herewith, titled "System and Method for Providing User Location-based Multi-zone Media,", the contents of each of which are hereby incorporated herein by reference in their entirety.

In general, block 230 may comprise presenting the identified media content, for example as identified at block 220. Accordingly, the scope of various aspects of this disclosure should not be limited by characteristics of any particular type of media content or of any particular manner of presenting media content.

The example method 200 continues execution at block 295. The continued execution may comprise any of a variety of characteristics. For example, block 295 may comprise looping execution flow back up to any of the previous blocks of the example method 200 and/or to any flow diagram block discussed herein.

For example, block 295 may loop execution flow back up to block 210 for continued determination of user location and identification/presentation of media content associated with the user's location. In such a scenario, as a user moves from a first zone to a second zone, the media content presented may change. For example, when a user is located in a kitchen zone the system may present kitchen-related advertising content to the user, and when the user moves to the recreation room the system may present recreation-related advertising content to the user.

The example method 200 may be performed by any of a variety of media (e.g., audio, video, etc.) system components, for example components local to a premises and/or components remote from the premises. In a first example configuration, blocks 210 and 230 may be performed by a central controller and/or speakers of a premises audio system, and block 220 may be performed by a computing system (e.g., a content provider) remote from the premises. Such distributed operation is discussed herein. In another example scenario, for example in which the identified media content has already been downloaded to a premises system (e.g., prior to the execution of the method 200, or block thereof), one or more of the premises audio system components may perform the entire method 200.

The above discussion of the example method 200 discussed above generally concerned identifying media content based on user location (e.g., location within a premises). Other factors in addition to, or instead of, location may be considered. An example method in which both user location and user identity are utilized to identify and present media content will now be discussed.

Figure 3:
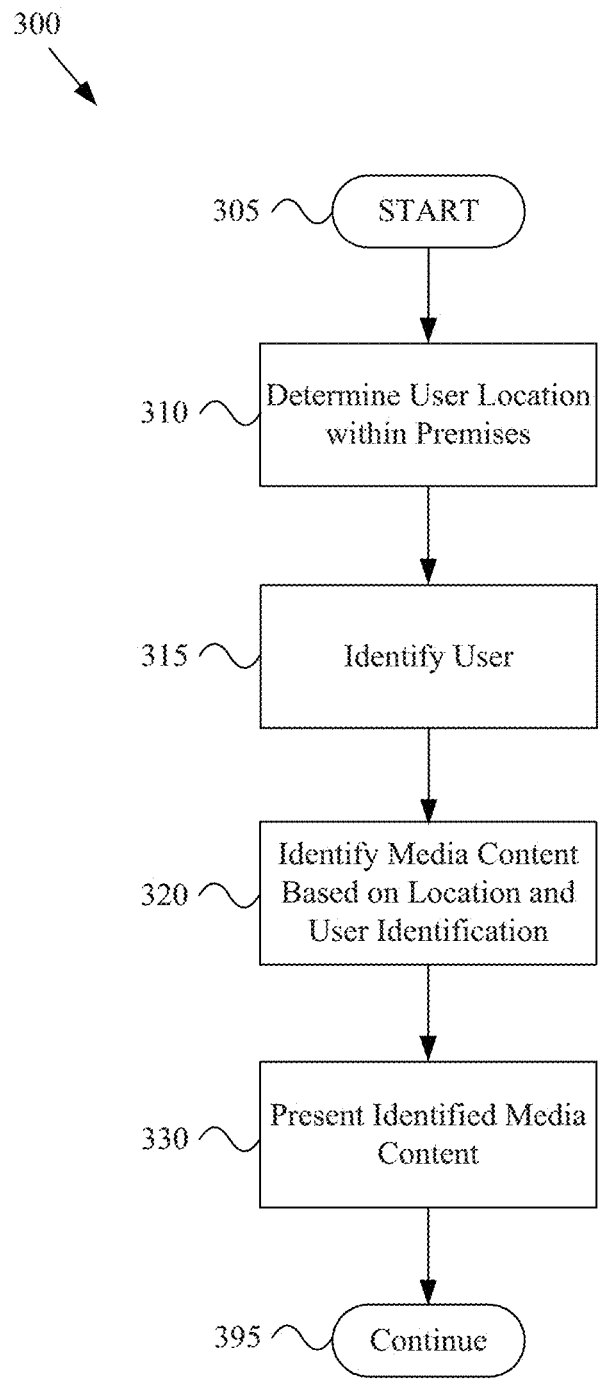
FIG. 3 is a flow diagram of an example method for providing zone-specific media, in accordance with various aspects of the present disclosure.

FIG. 3 is a flow diagram of an example method 300 for providing zone-specific media, in accordance with various aspects of the present disclosure.

The example method 300 begins executing at block 305. The example method 300 may begin executing in response to any of a variety of causes or conditions, non-limiting examples of which are presented herein. Block 305 may, for example, share any or all characteristics with block 205 of the example method 200 shown in FIG. 2 and discussed herein.

The example method 300 may, at block 310, comprise determining (or tracking) user location within a premises. Block 310 may comprise determining user location in any of a variety of manners, non-limiting examples of which are presented herein. Block 310 may, for example, share any or all characteristics with block 210 of the example method 200 shown in FIG. 2 and discussed herein.

The example method 300 may, at block 315, comprise identifying a user. Block 315 may comprise identifying the user in any of a variety of manners, non-limiting examples of which are presented herein.

For example, various sensors may be utilized to determine not only user location, but also the identity of the user. For example, in an example scenario utilizing personal electronic devices to track a user, a personal electronic device may be associated with a respective user thereof. Also for example, in a scenario in which audio sensors are utilized to track a user, a user's voice may be utilized to identify the user (e.g., utilizing voice recognition and/or identification technology). Additionally for example, in a scenario in which a vibration sensor is utilized to identify the user, the user may be identified by the magnitude of the vibration (e.g., due to user mass), the gate of the vibration (e.g., due to stepping cadence), etc. Further for example, assumptions regarding user identification and/or location may be utilized to identify a user (e.g., assumptions based on a predicted movement pattern for a known user, assumptions based on the identification of a user at an immediately adjacent sensor or area, assumptions based on a user being the only user detected in a premises thus far, etc.). As an example, a user detected yet not explicitly identified in an audio presentation zone may be presumptively identified as the user that was just identified in an immediately adjacent audio presentation zone. Also for example, a user detected yet not explicitly identified in front of the television during Monday night football may be presumptively identified as the user that is typically identified at that location at that time.

As will be discussed herein, user identification information may be utilized to select the media content to be presented to the user, for example at the determined user location.

Various examples of determining user identity are presented in U.S. application Ser. No. 14/725,904, filed concurrently herewith, titled "Multi-zone Media System and Method for Providing Multi-zone Media,", and U.S. application Ser. No. 14/726,019, filed concurrently herewith, titled "System and Method for Providing User Location-based Multi-zone Media,", the contents of each of which are hereby incorporated herein by reference in their entirety.

Note that blocks 310 and 315 may be performed for a plurality of users. For example, each of a plurality of users may be at different respective locations (e.g., at different respective zones) in a premises. In such a scenario, the methods 200 and/or 300 may be performed separately and in parallel for each user. In another example scenario, a plurality of users may be in a same zone. In such a scenario, the method 300 may comprise determining which user, if any, to identify for the selection and/or presentation of audio content in the zone. This will be discussed in more detail below.

In general block 315 may comprise identifying a user. Accordingly, the scope of this disclosure should not be limited by any particular manner of identifying a user.

The example method 300 may, at block 320, comprise identifying media content based at least in part on user location and user identity. Block 320 may comprise identifying the media content in any of a variety of manners, non-limiting examples of which are presented herein. Note that block 320 may share any or all characteristics with block 220 of the example method 200 shown in FIG. 2 and discussed herein.

Block 320 may, for example, comprise identifying the media content by searching a database, table, linked list, or other data structure by the user location determined at block 310 and by the user identity determined at block 315. For example, searching a database by an identified zone of a premises and a user identity may identify media content corresponding to the identified zone and identified user. Also for example, indexing a table by zone and user identity may provide an efficient mechanism by which media content associated with the zone and user may be found. Additionally for example, a linked list may be traversed by zone and user identity until a linked data structure associated with the zone and user identity is found, where the data structure identifies media content for the identified zone and user.

In an example advertising content implementation, a table, database, or other data structure may be established that associates (or links) a kitchen zone (e.g., zone 120 of FIG. 1) and first user with advertisements for healthy food products, kitchen appliances, cleansers, plumbing services, appliance repair services, kitchen safety products, etc. The kitchen zone and a second user may, for example, be associated with advertisements for snacks, energy drinks, and sweetened cereal. The kitchen zone may also be associated with a default set of media content, for example a general set of kitchen-related goods and services that may be identified by block 320 when the user cannot be identified (or when no user has been identified), when multiple users in the kitchen have conflicting identified media content, etc.

In another example, a recreation room zone (e.g., zone 110 of FIG. 1) and a first user may be associated with advertising media content for adult beverages, automobiles, tools, etc. The recreation room zone and a second user may be associated with advertising media content for video games, music, teen fashion, popular music, and movies. The recreation room zone may also be associated with a default set of media content, for example a general set of recreational goods and services that may be identified by block 320 when the user cannot be identified (or when no user has been identified), when multiple users in the recreation room have conflicting identified media content, etc.

Though the above examples generally discussed advertising media content, as explained herein, various aspect of this disclosure apply to any of a variety of different types of media content. For example, particular genres of music, channels, and/or artists may be associated with particular zones. For example, a first bedroom zone and a first user may be associated with content for children, while the first bedroom zone and a second user may be associated with traditional jazz. Also for example, a recreation room zone and a first user may be associated with rock music, and the recreation room zone and a second user may be associated with country music. Additionally for example, a kitchen zone and a first user may be associated with smooth jazz, the kitchen zone and a second user may be associated with world music, the kitchen zone and a third user may be associated with classical music, and the kitchen zone may have a default association with popular music.

In various example scenarios, there may be multiple users at or near a location (e.g., in an area or zone), where each of the users is associated with different media content in the zone. For example, a first user and a second user may be in a kitchen, where the first user is associated with kitchen advertising content for kitchen appliances, cleansers, juice, and healthy food options, and the second user is associated with kitchen advertising content for snacks, energy drinks, and juice. In such a scenario, block 320 may comprise resolving the conflict, for example by identifying media content common to both users, by selecting media content associated with the higher-priority user, etc. Non-limiting examples of such conflict resolution are presented herein.

In an example implementation, block 320 may comprise determining which audio content to present based at least in part on user priority. A user priority may, for example, be user-configurable, but may also be configurable by a third party (e.g., by a content provider, etc.). For example, users of a system implementing the method 300 may be assigned respective priorities that block 320 may utilize to resolve media presentation conflicts. For example, a head of household or primary purchaser may be assigned a top priority, and other users may be assigned other respective priorities (e.g., based on purchasing power, based on purchasing habits, based on gender, based on age, etc.). In an example scenario, a higher priority user may essentially take over a zone, at least with regard to particular content (e.g., advertising content, music content, channel content, etc.). Then when the higher priority user leaves the area being served by the taken-over zone, conflict resolution may again be performed for those remaining. Users may, for example, be assigned a same priority, in which case one or more other conflict resolution criteria may be utilized (e.g., first-come-first-served, content-based priority, alternating content between users, etc.).

Conflict resolution criteria may also be time-based. For example, user priority or any of the conflict resolution criteria discussed herein may change according to time-of-day. For example, a first user may have top priority during the morning and afternoon, while a second user may have top priority during the evening. Such operation may also, for example, be extended to day-of-week, for example, changing priorities based on day-of-week and/or time-of-day.

Note that user-based prioritization or other conflict resolution criteria may be location (or zone) specific. For example, a user might have a highest priority for the user's bedroom and a game room, while another user might have highest priority in common areas of the premises.

In another example implementation, block 320 may comprise determining which media to present in a zone based at least in part on content priority. For example, particular content (e.g., content from a preferred advertiser, time-sensitive advertising content, etc.) may have priority over other content. For example, in an example scenario in which multiple users are located in a same zone and different respective media content is associated with each of the respective users, block 320 may comprise selecting from the different respective media content based on priority of the content.

In still another example implementation, block 320 may comprise determining which media to present in a zone on a first-come-first-served basis (e.g., based on the first user to enter the zone). Such operation may be universal (e.g., throughout the premises) or zone-by-zone. For example, a family room might be designated as a zone in which media content is determined on a first-come-first-served basis, while kitchen and dining room zones might be designated as zones in which a user-based priority and/or content-based priority is utilized. Also for example, block 320 may comprise utilizing a first-come-first-served decision criterion when a conflict involves multiple users having a same priority.

In yet another example implementation, block 320 may comprise determining media content to present in a zone in a round-robin fashion (i.e., cycling through the users in the zone). For example, in an example scenario in which three users are identified in a zone, block 320 may identify first advertising content based on the first user, second advertising content based on the second user, third advertising content based on the third user, fourth advertising content based on the first user, fifth advertising content based on the second user, etc.

In yet another example implementation, block 320 may comprise identifying the media content based on a rating of the content (e.g., adult oriented advertising, etc.). For example, in an example scenario in which block 320 might normally have identified media content comprising an advertisement for an adult beverage, if block 315 identified a child user in the zone, block 320 may instead identify media content more appropriate for the child.

In still another example implementation, block 320 may comprise identifying the media content based at least in part on a "locked" status. For example, a user that desires to be presented with media content in a zone may lock the zone to the user's identity, thus disabling various prioritization functionality. In such a manner, a user enjoying media content in a zone may lock the zone to the user so that only the user's identity will be used by block 320 to identify media content, regardless of the presence of other users.

Block 320 may, for example, comprise identifying the media content in a default manner for the zone. For example, when no user is detected in a zone or a user is detected but not identified, block 320 may comprise identifying the media content based on the zone alone (e.g., in accordance with the operation of block 220 of the example method 200 of FIG. 2). As discussed herein, default media content for a zone may also be utilized in a scenario in which there are multiple users identified in a zone, or for example multiple users with same respective priorities in a zone.

In general, block 320 may comprise identifying media content based at least in part on user location and user identification. Block 320 may comprise performing such identifying in any of a variety of manners. Accordingly, the scope of various aspects of this disclosure should not be limited by characteristics of any particular manner of performing such identifying or by characteristics of any particular type of media content.

The example method 300 may, at block 330, comprise presenting the identified media content. Block 330 may comprise presenting the identified media content in any of a variety of manners, non-limiting examples of which are presented herein. Block 330 may, for example, share any or all characteristics with block 230 of the example method 200 shown in FIG. 2 and discussed herein.

The example method 300 continues execution at block 395. The continued execution may comprise any of a variety of characteristics. For example, block 395 may comprise looping execution flow back up to any of the previous blocks of the example method 300 and/or to any flow diagram block discussed herein.

For example, block 395 may loop execution flow back up to block 310 for continued determination of user location and identification, and identification/presentation of media content associated with the user's location. In such a scenario, as a user moves between zones and/or the user population in a zone changes, the media content presented may change.

Figure 4:
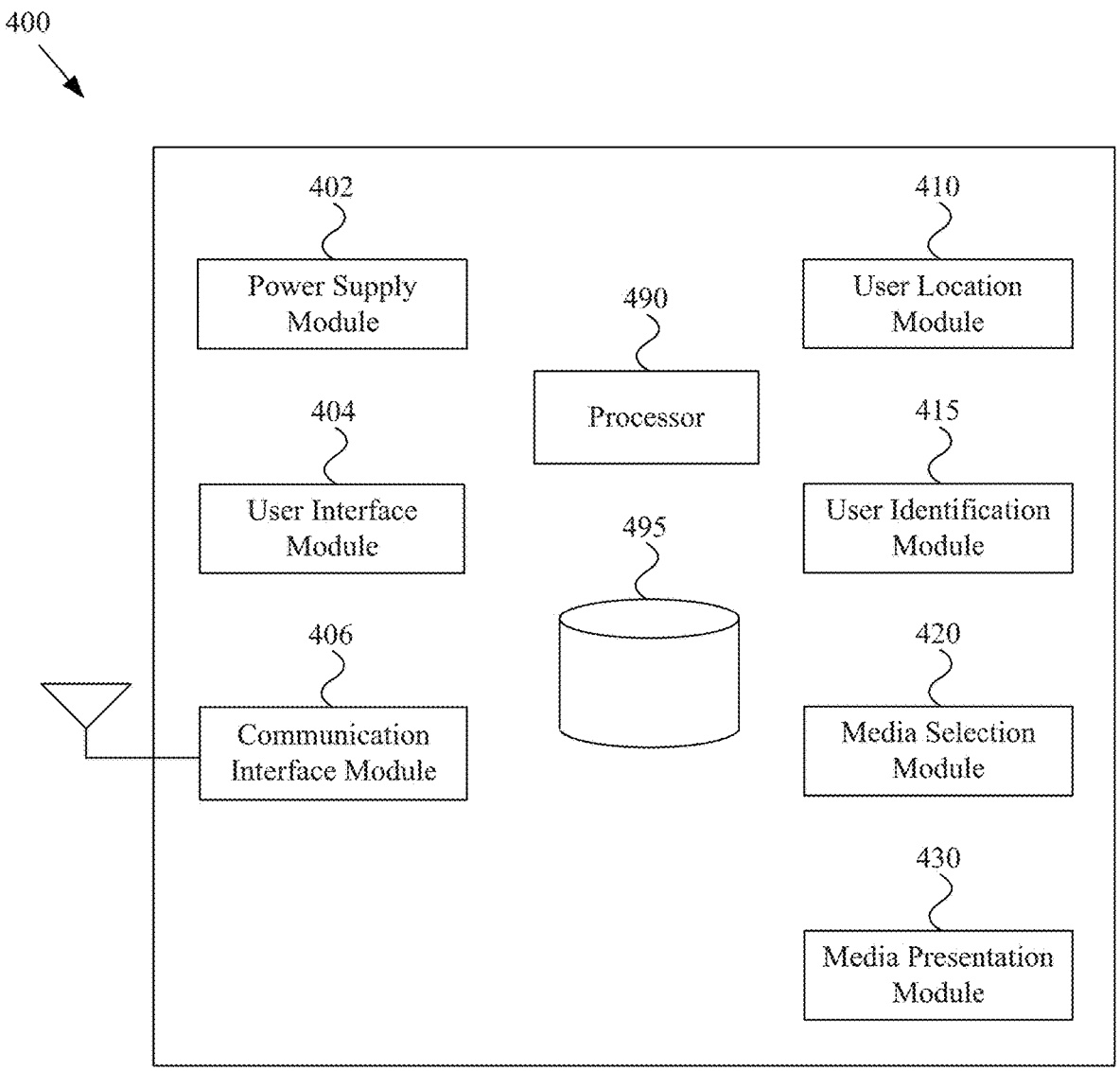
FIG. 4 is a block diagram of an example media system for providing zone-specific media, in accordance with various aspects of the present disclosure.

As explained herein, the example methods 200, 300, and 600 presented herein, or any portion thereof, may be performed by one or more loudspeakers, a central media controller (e.g., for a premises), a remote system (e.g., of a media content provider), or other apparatus. Such performance may be performed by a single system component, by a plurality of components distributed throughout a premises, by a plurality of components distributed through a premises and remote from the premises, etc. FIG. 4 provides a non-limiting example of a system that may implemented any of the example methods presented herein or any portion thereof.

FIG. 4 is a block diagram of an example media system 400, in accordance with various aspects of the present disclosure. The example media system 400 may, for example, operate to or be operable to perform any or all of the functionality discussed herein (e.g., with regard to the example methods illustrated in FIGS. 2, 3, and 6, and discussed herein). The media system 400 may, for example, comprise any of a variety of media systems and/or media system components. For example, the media system 400 may comprise a loudspeaker, a media controller, a television, a remote server of a content provider, etc., but the scope of this disclosure is not limited thereto. The media system 400 may, for example, share any or all characteristics with the loudspeakers or controller 111 shown in FIG. 1.

The media system 400 may, for example, comprise a power supply module 402. The power supply module 402 may, for example, comprise electrical circuitry operable to receive and/or prepare electrical power for utilization by the other modules of the media system 400. The power supply module 402 may, for example, comprise an A/C power module adapted for plugging into a premises power outlet and/or for direct integration into the A/C power system of a premises. The power supply module 402 may also, for example, be operable to receive and/or prepare electrical power from a power-over-Ethernet (POE) system. The power supply module 402 may additionally, for example, be operable to receive and/or prepare battery power (e.g., manage battery operation for power supply, recharging, etc.). The power supply module 402 may also, for example, be operable to provide electrical power (e.g., via Ethernet or other wiring) to other media presentation devices (e.g., to other loudspeakers).

The example media system 400 may also, for example, comprise a user interface module 404. The user interface module 404 may, for example, be operable to perform any or all of the user interface functionality discussed herein. For example, the user interface module 404 may be operable to perform the user and/or output functionality discussed herein with regard to at least the example method 200 illustrated in FIG. 2, the example method 300 illustrated in FIG. 3, and the example method 600 illustrated in FIG. 6.

For example, the user interface module 404 may comprise any one or more of a variety of sensors for user input. For example, the user interface module 404 may comprise a touch sensor and associated circuitry for processing touch inputs. The touch sensor for user touch input may, for example, comprise a touch pad, touch screen, heat sensor, capacitive sensor, piezo-resistive sensor, piezo-electric sensor, light sensor, MEMS inertial sensor, etc. The touch input may, for example, comprise a tap input (e.g., single-tap, double-tap, n-tap, etc.). The touch input may, for example, comprise a touch input on a graphical user interface feature being presented to the user on a touch screen. The touch input may also, for example, comprise a swipe input (e.g., for adjustment of media presentation characteristics, like volume, etc.). Also for example, the user interface module 404 may comprise a microphone sensor and associated circuitry for processing audible inputs (e.g., voice commands).

The sensors may, for example, be included on or within an enclosure of the media system 400 (e.g., in a single or multiple enclosure system). Additionally for example, the sensors may be physically separate from various enclosures of the media system 400. As discussed herein, for example, touch sensors and/or microphones may be incorporated into switch plates, door frames, doors, etc., and thus need not necessarily be physically integrated with the media system 400 or any component thereof. In such example implementations, the sensors may be hardwired with the media system 400 and/or may wirelessly communicate with the media system 400. In a wireless communication scenario, the user interface module 404 may utilize wireless communication capability of the communication interface module 406 discussed herein.

The user interface module 404 may also, for example, comprise any one or more of a variety of user output devices (e.g., for providing audio and/or video media to a user, for providing audio feedback to a user, for visual output feedback to a user, etc.). For example, the user interface module 404 may operate to provide output to the user to indicate the mode of operation in which the media system 400 is operating, to indicate the media output characteristics of the media currently being presented to the user, to output user input features (e.g., graphical user interface features), etc.

The user interface module 404 may further, for example, operate to interface with a remote control device (e.g., a dedicated remote control device, a smart phone, etc.). For example, the user interface module 404 may utilize the communication interface module 406 to communicate with the user's smart phone.

The example media system 400 may additionally, for example, comprise a communication interface module 406. The communication interface module 406 may, for example, be operable to perform any or all of the communication functionality discussed herein (e.g., in the discussions of FIGS. 1-6). Such communication functionality may, for example, comprise communicating with other systems or devices (e.g., other loudspeakers, central controllers, media servers, etc.). Such communication functionality may, for example, comprise communicating information regarding general system operation, user inputs, zone identification, user identification, media content, etc.

The communication interface module 406 may, for example, be operable to establish, maintain, and utilize communication links with other devices (e.g., with loudspeakers, with a central media controller, with a local media server within a premises over a local area network, with a remote media server outside of a premises over the Internet, cable, landline and/or other networks, with remote control devices, smart phones, smart watches, etc.). The communication interface module 406 may, for example, be operable to communicate over wired, wireless, or optical links.

The communication interface module 406 may, for example, be operable to interface with a wired and/or wireless local area network (LAN), personal area network (PAN), wide area network (WAN), etc. The communication interface module 406 may, for example, be operable to interface with a telecommunication network (e.g., cellular, landline, satellite, etc.), a television network (e.g., cable, satellite, etc.), etc. The communication interface module 406 may, for example, be operable to communicate utilizing any of a variety of standard and/or proprietary communication protocols (e.g., Wi-Fi, Ethernet, Bluetooth, near field, 4G, 5G, LTE, MoCA, 802.15, etc.).

The example media system 400 may also, for example, comprise a user location module 410. The user location module 410 may, for example, be operable to perform any or all of the user-locating functionality discussed herein. For example, the user location module 410 may be operable to perform functionality discussed herein with regard to block 210 of the example method 200 shown in FIG. 2; block 310 of the example method 300 shown in FIG. 3; block 610 of the example method 600 shown in FIG. 6; etc.

For example, the user location module 410 may be operable to determine a location of a user in a premises. For example, the user location module 410 may be operable to identify a zone in which the user is present, coordinates of a user, etc. The user location module 410 may, for example, be operable to determine respective locations of multiple users (e.g., in different respective zones, in same zones, etc.).

The example media system 400 may also, for example, comprise a user identification module 415. The user identification module 415 may, for example, be operable to perform any or all of the user-identifying functionality discussed herein. For example, the user identification module 415 may be operable to perform functionality discussed herein with regard to block 315 of the example method 300 shown in FIG. 3; block 615 of the example method 600 shown in FIG. 6; etc.

For example, the user identification module 415 may be operable to identify a user in a premises and/or in a zone of a premises. For example, the user identification module 415 may be operable to identify one or more users in a zone identified by the user location module 410. The user identification module 415 may, for example, be operable to determine respective identifications of multiple users (e.g., in different respective zones, in same zones, etc.).

The example media system 400 may also, for example, comprise a media selection module 420. The media selection module 420 may, for example, be operable to perform any or all of the media selection functionality discussed herein. For example, the media selection module 420 may be operable to perform functionality discussed herein with regard to block 220 of the example method 200 shown in FIG. 2; block 320 of the example method 300 shown in FIG. 3; block 620 of the example method 600 shown in FIG. 6; etc.

For example, the media selection module 420 may be operable to select media content based, at least in part, on a user location determined by the user location module 410. Also for example, the media selection module 420 may be operable to select media content based, at least in part, on a user identity determined by the user identification module 415 (e.g., in conjunction with the user location determined by the user location module 410). For example, the media selection module 420 may be operable to select media content to present in one or more zones of a premises, where the same media content may be selected for presentation in more than one zone (or all zones) and/or different respective media content may be selected for presentation in different respective zones.

The example media system 400 may also, for example, comprise a media presentation module 430. The media presentation module 430 may, for example, be operable to perform any or all of the media presentation functionality discussed herein. For example, the media presentation module 430 may be operable to perform functionality discussed herein with regard to block 230 of the example method 200 shown in FIG. 2; block 330 of the example method 300 shown in FIG. 3; blocks 630 of the example method 600 shown in FIG. 6; etc.

For example, the media presentation module 430 may be operable to present media content identified by the media selection module 420 (e.g., at a user location determined by the user location module 410). For example, the media presentation module 430 may be operable to present media content in one or more zones of a premises, where the same media content may be presented in more than one zone (or all zones) and/or different respective media content may be presented in different respective zones.

The example media system 400 may, for example, comprise a processor 490 and a memory 495. Any or all of the functionality or associated modules discussed herein may, for example, be implemented in hardware and/or implemented using a combination of hardware and software (e.g., a processor operating in accordance with software instructions stored on a non-transitory computer-readable medium). For example, the processor 490 may operate in accordance with software instructions stored in the memory 495 to implement all or any part of the modules discussed herein. The processor 490 may, for example, comprise one or more of a general-purpose microprocessor, a digital signal processor (DSP), an application specific integrated circuit (ASIC), a microcontroller, etc. The memory 495 may, for example, comprise one or more of a non-volatile and/or volatile memory. Note that the memory 490 may also be utilized for storing media content, media presentation characteristics, user profile information, etc.

Figure 5:
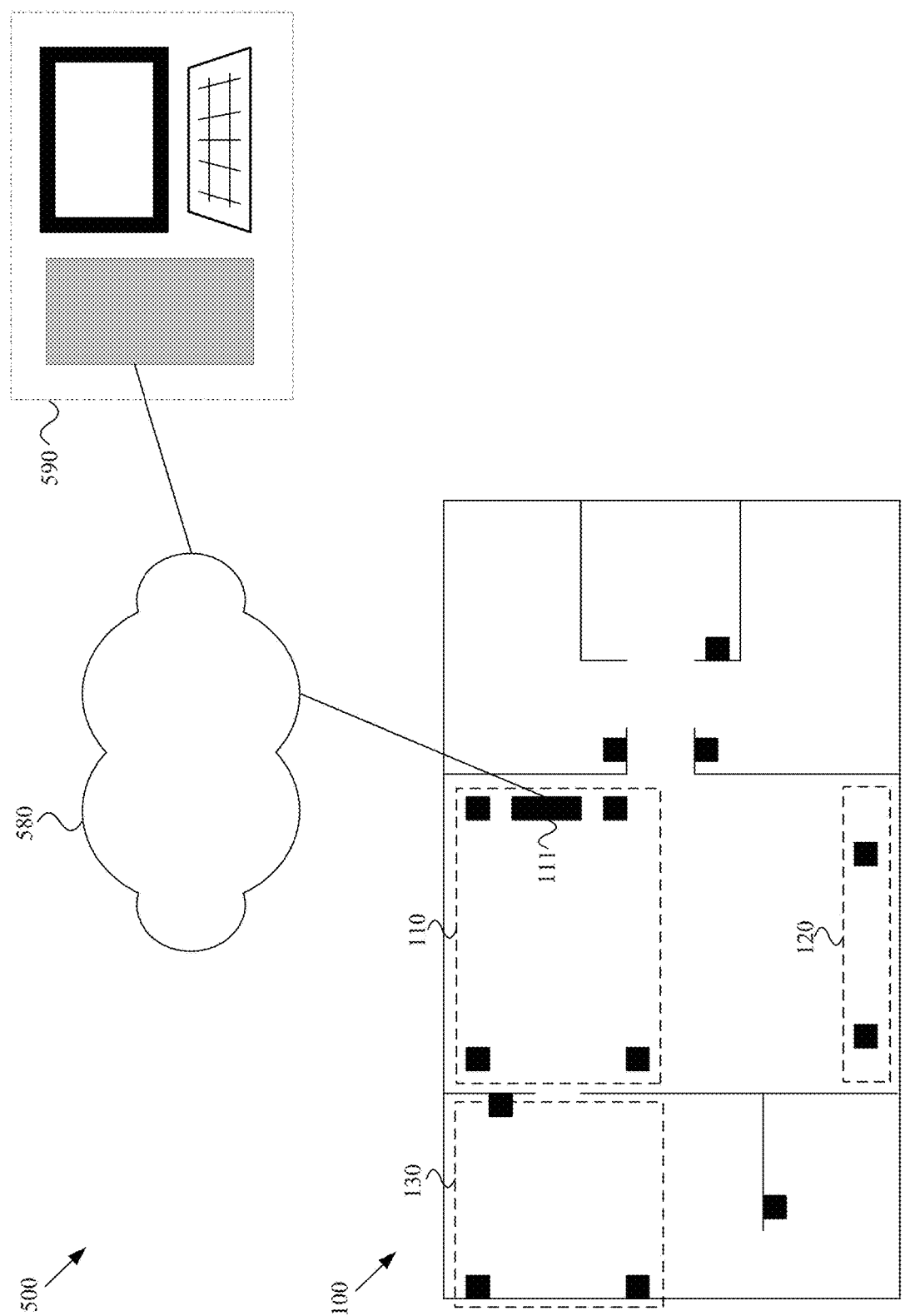
FIG. 5 is a block diagram of an example media system for providing zone-specific media, in accordance with various aspects of the present disclosure.

As discussed herein, the various aspects of the present disclosure may be performed by a single component of a media system, by multiple components of a media system at a premises, by multiple components of a media system distributed within a premises and remote from the premises. An illustrative example of a distributed media system is shown at FIG. 5. In particular, FIG. 5 is a block diagram of an example media system 500 for providing zone-specific media, in accordance with various aspects of the present disclosure.

The example media system 500 comprises the premises 100 of FIG. 1. The example premises 100 comprises a plurality of zones 110, 120, 130, etc. The example premises 100 also includes a central media controller 111. The media controller 111 may, for example, perform any or all aspects of the example methods 200 and 300 shown in FIGS. 2 and 3 and discussed herein.

The example media system 500 also comprises a remote system 590 remote from the premises 100. The remote media system 590 may, for example, comprise a media content server system of a media content provider. The remote media system 590 may, for example, perform any or all aspects of the example methods 200 and 300 shown in FIGS. 2 and 3 and discussed herein. The remote media system 590 and the central media controller 111 of the premises 100 are communicatively coupled to each other over a communication network 580 (e.g., the Internet, a cable communication network, a telephone line communication network, a wide area network, a campus area network, etc.).

Figure 6:
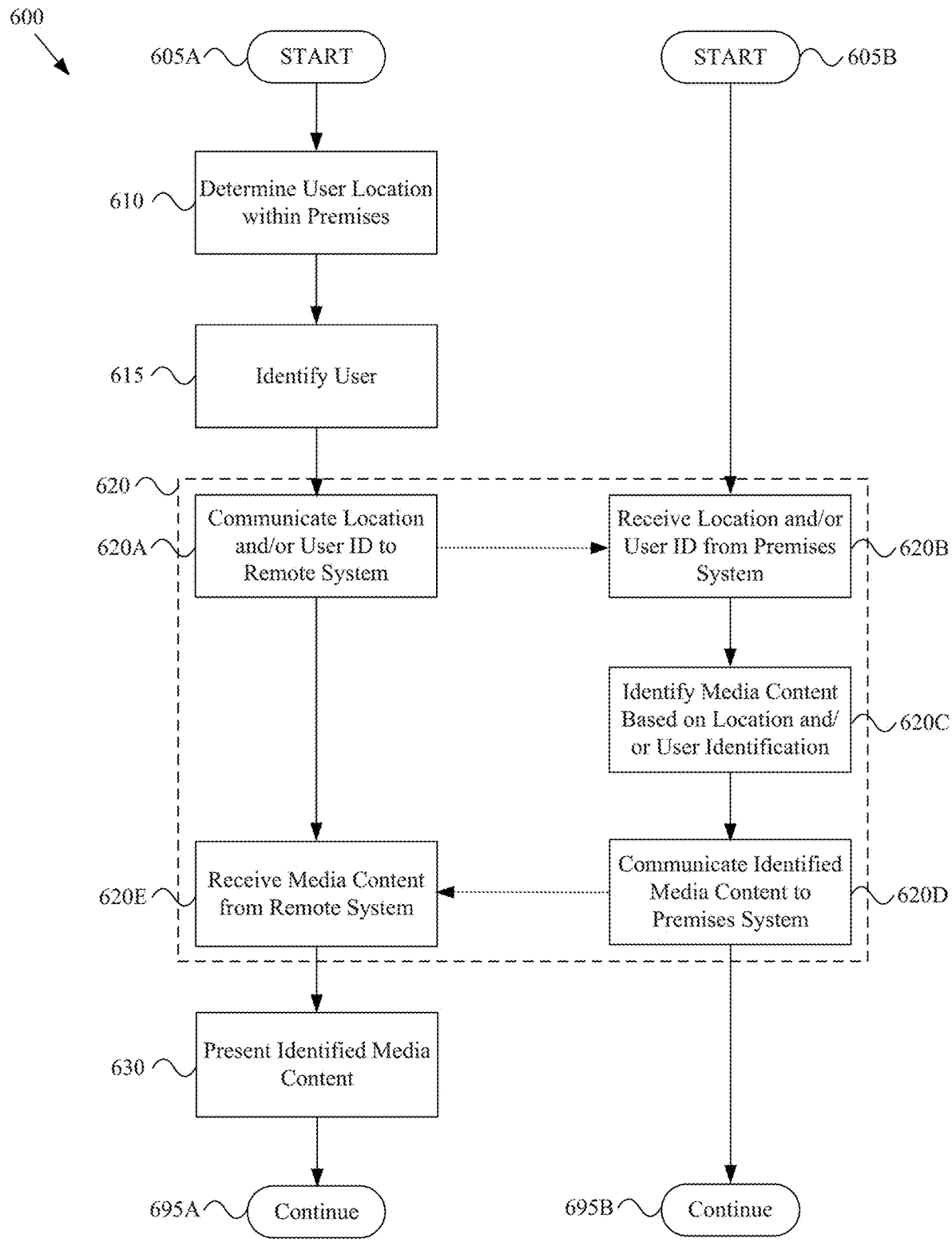
FIG. 6 is a flow diagram of an example method for providing zone-specific media, in accordance with various aspects of the present disclosure.

In an example scenario, the central media controller 111 of the premises 100 and the remote media system 590 each perform respective aspects of the functionality discussed herein. An example of such functionality is shown in FIG. 6. In particular, FIG. 6 is a flow diagram of an example method 600 for providing zone-specific media, in accordance with various aspects of the present disclosure. FIGS. 5 and 6 will now be discussed together. FIG. 6, for example, is shown having two parallel flows, with the left side flow being performed by the central media controller 111 of the premises 100 (e.g., or any of a variety of types of apparatus in the premises 100), and the right side flow being performed by the remote media system 590 (e.g., or any of a variety of types of apparatus remote from the premises 100).

The example method 600 begins executing at the media controller 111 of the premises 100 at block 605A, and begins execution at the remote server 590 remote from the premises 100 at block 605B. The method 600 may begin executing in response to any of a variety of causes or conditions. Blocks 605A and 605B may, for example, share any or all characteristics with blocks 205 and 305 of the example methods 200 and 300 illustrated in FIGS. 2 and 3 and discussed herein.

The example method 600 may, at block 610, comprise the media controller 111 of the premises 100 determining (or tracking) user location within the premises 100. Block 610 may comprise determining user location in any of a variety of manners, non-limiting examples of which are presented herein. Block 610 may, for example, share any or all characteristics with blocks 210 and 310 of the example methods 200 and 300 shown in FIGS. 2 and 3 and discussed herein.

The example method 600 may, at block 615, comprise the media controller 111 identifying a user. Block 615 may comprise identifying the user in any of a variety of manners, non-limiting examples of which are presented herein. Block 615 may, for example, share any or all characteristics with block 315 of the example method 300 shown in FIG. 3 and discussed herein.

The example method 600 may, at block 620, comprise identifying media content based at least in part on user location and/or user identity. Block 620 may comprise identifying the media content in any of a variety of manners, non-limiting examples of which are presented herein. Note that block 620 may share any or all characteristics with blocks 220 and 320 of the example methods 200 and 300 shown in FIGS. 2 and 3 and discussed herein.

Block 620 is shown performed in first part by the media controller 111 of the premises 100 and in second part by the remote media system 590. Block 620A may, for example, comprise the media controller 111 communicating user location information (e.g., as determined at block 610) and/or user identity information (e.g., as determined at block 615) to the remote media system 590. The media controller 110, an example of which 400 is shown at FIG. 4, may utilize a communication interface module 406 to communicate such information to a reciprocal communication interface module of the remote media system 590 over the communication network 580.

Block 620B may, for example, comprise the remote media system 590 receiving the user location information and/or user identity information from the central media controller 111. The remote media system 590 may, for example, receive such information at a communication interface module (e.g., like that of the communication interface module 406 discussed herein).

Block 620C may, for example, comprise the remote media system 590 identifying media content based, at least in part, on the information of user location and user identity received at block 620B. Block 620C may comprise identifying the media content in any of a variety of manners, non-limiting examples of which are presented herein. Block 620C may, for example, share any or all characteristics with blocks 220 and 320 of the example methods 200 and 300 shown in FIGS. 2 and 3 and discussed herein.

Block 620D may, for example, comprise the remote media system 590 communicating the identified media content (e.g., as identified at block 620C) to the media controller 111 of the premises 100. Block 620D may comprise performing such communication in any of a variety of manners, non-limiting examples of which are presented herein. For example, the remote media system 590 may utilize a communication interface module (e.g., like that of communication interface module 406) to communicate the identified media content to a communication interface module 406 of the media controller 111.

The remote media system 590 may, for example, insert the identified media content (e.g., advertising media content) in a media stream (e.g., a channel stream, a program stream, a music stream, a playlist stream, a movie stream, etc.) or other form of media communication being communicated to the media controller 111. The remote media system 590 may also, for example, communicate the identified media content to the media controller 111 separate from a media stream being communicated to the media controller 111. The media controller 111 may, for example, store such content for future use. The remote media system 590 may additionally, for example, communicate an identifier of the identified media content. In such a scenario, the media controller 111 may retrieve the identified media content from a source other than the remote media system 590 (e.g., from a local memory 495, from an Internet site, etc.).

Block 620E may, for example, comprise the media controller 111 of the premises 100 receiving the identified media content from the remote media system 590. The media controller 111 may, for example, receive the identified media content at a communication interface module 406.

In general, block 620 may comprise identifying media content based at least in part on user location and/or user identity. Accordingly, the scope of this disclosure is not limited by characteristics of any particular manner of identifying media content.

The example method 600 may, at block 630, comprise presenting the identified media content received at block 620E. Block 630 may comprise presenting the identified media content in any of a variety of manners, non-limiting examples of which are presented herein. Block 630 may, for example, share any or all characteristics with blocks 230 and 330 of the example methods 200 and 300 shown in FIGS. 2 and 3 and discussed herein.

The example method 600 continues execution at blocks 695A and 695B. The continued execution may comprise any of a variety of characteristics. For example, blocks 695A and 695B may comprise looping execution flow back up to any of the previous blocks of the example method 600 and/or to any flow diagram block discussed herein.

For example, blocks 695A and 695B may loop execution flow back up to blocks 605A and 605B, respectively, for continued determination of user location and/or identification, and identification/presentation of media content associated with the user's location and/or identification. In such a scenario, as a user moves between zones and/or the user population in a zone changes, the media content presented may change.

In summary, various aspects of this disclosure provide a system and method for providing user location-based multi-zone media. While the foregoing has been described with reference to certain aspects and embodiments, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular embodiment(s) disclosed, but that the disclosure will include all embodiments falling within the scope of the appended claims.

What is claimed is:

1. A system comprising:
   at least one network microphone device;
   at least one processor;
   at least one tangible, non-transitory computer-readable medium; and
   program instructions stored on the at least one tangible, non-transitory computer-readable medium that are executable by the at least one processor such that the system is configured to:
   receive, via the at least one network microphone device, a voice command for two or more playback devices to be grouped for synchronous playback of audio content, wherein the voice command does not identify the two or more playback devices;
   based on context information, wherein the context information comprises information received from a sensor other than the at least one network microphone device:
   identify a given playback device of the two or more playback devices that is to be grouped for synchronous playback of audio content; and
   dynamically select the given playback device to be grouped for synchronous playback of audio content; and
   based on the voice command, cause the two or more playback devices, including the given playback device, to be grouped for (i) synchronous playback of audio content, and (ii) synchronous execution of playback control commands.

2. The system of claim 1, wherein the voice command comprises a command to play back audio content, the system further comprising program instructions stored on the non-transitory computer-readable medium that are executable by the at least one processor such that the system is configured to:
   based on the voice command, cause the two or more playback devices to play back audio content in synchrony.

3. The system of claim 1, wherein the at least one network microphone device comprises one of (i) a controller device, (ii) the given playback device, or (iii) another playback device.

4. The system of claim 1, wherein the context information includes information regarding user location relative to at least one of the two or more playback devices.

5. The system of claim 1, wherein the context information comprises an indication that the given playback device is currently playing back given audio content.

6. The system of claim 5, wherein the program instructions that are executable by the at least one processor such that the system is configured to cause the two or more playback devices to play back audio content in synchrony comprise program instructions that are executable by the at least one processor such that the system is configured to:
   cause the two or more playback devices to play back the given audio content in synchrony.

7. The system of claim 1, wherein the context information comprises an indication that the given playback device most recently played back audio content.

8. At least one tangible, non-transitory computer-readable medium, wherein the at least one tangible, non-transitory computer-readable medium is provisioned with program instructions that, when executed by at least one processor, cause a system to:
   receive, via at least one network microphone device, a voice command for two or more playback devices to be grouped for synchronous playback of audio content, wherein the voice command does not identify the two or more playback devices;
   based on context information, wherein the context information comprises information received from a sensor other than the at least one network microphone device:
   identify a given playback device of the two or more playback devices that is to be grouped for synchronous playback of audio content; and
   dynamically select the given playback device to be grouped for synchronous playback of audio content; and based on the voice command, cause the two or more playback devices, including the given playback device, to be grouped for (i) synchronous playback of audio content, and (ii) synchronous execution of playback control commands.

9. The at least one tangible, non-transitory computer-readable medium of claim 8, wherein the voice command comprises a command to play back audio content, and wherein the at least one tangible, non-transitory computer-readable medium is also provisioned with program instructions that, when executed by at least one processor, cause the system to:

based on the voice command, cause the two or more playback devices to play back audio content in synchrony.

10. The at least one tangible, non-transitory computer-readable medium of claim 8, wherein the at least one network microphone device comprises one of (i) a controller device, (ii) the given playback device, or (iii) another playback device.

11. The at least one tangible, non-transitory computer-readable medium of claim 8, wherein the context information includes information regarding user location relative to at least one of the two or more playback devices.

12. The at least one tangible, non-transitory computer-readable medium of claim 8, wherein the context information comprises an indication that the given playback device is currently playing back given audio content.

13. The at least one tangible, non-transitory computer-readable medium of claim 12, wherein the program instructions that, when executed by at least one processor, cause the system to play back audio content in synchrony comprise program instructions that, when executed by at least one processor, cause the system to:

cause the two or more playback devices to play back the given audio content in synchrony.

14. The at least one tangible, non-transitory computer-readable medium of claim 8, wherein the context information comprises an indication that the given playback device most recently played back audio content.

15. A method carried out by a system, the method comprising:

receiving, via at least one network microphone device, a voice command for two or more playback devices to be grouped for synchronous playback of audio content, wherein the voice command does not identify the two or more playback devices;

based on context information, wherein the context information comprises information received from a sensor other than the at least one network microphone device:

identifying a given playback device of the two or more playback devices that is to be grouped for synchronous playback of audio content; and dynamically selecting the given playback device to be grouped for synchronous playback of audio content; and based on the voice command, causing the two or more playback devices, including the given playback device, to be grouped for (i) synchronous playback of audio content, and (ii) synchronous execution of playback control commands.

16. The method of claim 15, wherein the voice command comprises a command to play back audio content, the method further comprising:

based on the voice command, causing the two or more playback devices to play back audio content in synchrony.

17. The method of claim 15, wherein the at least one network microphone device comprises one of (i) a controller device, (ii) the given playback device, or (iii) another playback device.

18. The method of claim 15, wherein the context information includes information regarding user location relative to at least one of the two or more playback devices.

19. The method of claim 15, wherein the context information comprises an indication that the given playback device is currently playing back given audio content.

20. The method of claim 15, wherein the context information comprises an indication that the given playback device most recently played back audio content.

* * * * *